United States Patent [19]
Chee

[11] Patent Number: 4,616,109
[45] Date of Patent: Oct. 7, 1986

[54] DOUBLE CASSETTE DECK

[76] Inventor: Tseng Chee, Flat C., 5/F., Hanking Court, 43-49 Cloudview Rd., North Point, Hong Kong

[21] Appl. No.: 570,129

[22] Filed: Jan. 12, 1984

[51] Int. Cl.$^4$ .............................................. H04M 1/64
[52] U.S. Cl. .................................. 179/6.03; 360/96.3; 360/96.4; 360/105
[58] Field of Search ...................... 179/6.01, 6.03, 6.13, 179/6.16; 360/69, 90, 91, 92, 96.3, 96.4, 105

[56] References Cited

U.S. PATENT DOCUMENTS

| | | | |
|---|---|---|---|
| 3,968,329 | 7/1976 | Darwood | 179/6.03 |
| 3,976,236 | 8/1976 | Catto | 226/50 |
| 4,385,205 | 5/1983 | Jacobson | 179/6.03 |
| 4,396,803 | 8/1983 | Hashimoto | 179/6.03 |
| 4,445,000 | 4/1984 | Hashimoto | 179/6.03 |

*Primary Examiner*—Robert L. Richardson
*Attorney, Agent, or Firm*—Jordan and Hamburg

[57] ABSTRACT

A double cassette deck to be used for a telephone answering machine comprises a main chassis having at least first and second side portions, a driving shaft rotationally retained in the main chassis and having driving portions at both ends extending through the main chassis first and second side portions, respectively, and at least one driving means provided at the main chassis for rotating the driving shaft. Two tape cassettes to be used in the cassette deck are located on the respective side portions parallel to each other, and when the tapes of the cassettes are firmly engaged with the driving portions of the driving shaft, the tapes are moved at a constant speed. The double cassette deck further comprises a first head assembly slidably connected to the first side portion, and a second head assembly connected to the second side portion. The first head assembly includes first actuating means for intermittently advancing the cassette tape, and the second head assembly includes second actuating means for intermittently advancing tape of the cassette on the second side portion. Controlling means control the first and second head assemblies so that the cassette deck can be used as a tape recorder and a telephone answering machine.

11 Claims, 10 Drawing Figures

Sheet 2

DOUBLE CASSETTE DECK

BACKGROUND OF THE INVENTION AND PRIOR ART STATEMENT

The present invention relates to a double cassette deck to be used as a regular cassette tape recorder and a telephone answering machine.

A double cassette deck for use as a tape recorder and a telephone answering machine is already known, as disclosed in U.S. Pat. Nos. 3,728,489 and 4,230,909. In these patents, two tape cassettes are used, wherein one is for sending a message to a telephone caller when receiving a telephone call, and the other is for recording a message from the telephone caller after sending the message to the caller. The message from the caller recorded on the tape can be played back later as in a regular tape recorder. These patents disclose electrical systems for operating the telephone answering machine when receiving a telephone call but do not substantially disclose mechanical systems thereof. Namely, what is disclosed and required in the patent mechanically, not electrically, is that two tape cassettes should be operated independently as in a regular tape recorder.

A double cassette deck available on the market satisfies the mechanical requirement as stated above, that is, two tape cassettes can be independently operated. Generally, two tape cassettes are located on one side of the answering machine and are disposed parallel to each other so that the side faces of the tape cassettes face outwardly from the side of the answering machine. The mechanical parts for the two tape casettes substantially independent, which means that mechanically two cassette tape recorders are simply combined into one telephone answering machine. Even if the two tape cassettes are not arranged as stated above, the above feature that two cassette tape recorders are combined into one machine does not substantially change. Therefore, the double cassette deck for use as a telephone answering machine is not compact.

Accordingly, one object of the invention is to provide a compact double cassette deck for use as a tape recorder and a telephone answering machine.

Another object of the invention is to provide a double cassette deck as stated above, which is mechanically simplified.

Further objects and advantages of the invention will be apparent from the following description of the invention.

SUMMARY OF THE INVENTION

A double cassette deck in accordance with the present invention is adapted to be used as a telephone answering machine and a regular cassette tape recorder. The double cassette deck comprises a main chassis having at least first and second side portions, in which two tape cassettes are respectively located parallel to each other, a drive shaft rotationally retained in the main chassis and having driving portions at both ends, and at least one driving means provided at the main chassis for rotating the drive shaft. The driving portions extend through the first and second side portions of the main chassis respectively, so that when the tapes are firmly engaged with the driving portions, the tapes are moved at constant speed. The double cassette deck further comprises a first head assembly slidably connected to the first side portion and including first actuating means for intermittently moving the cassette tape at the first side portion, a second head assembly connected to the second side portion including second actuating means for intermittently moving the cassette tape at the second side portion, and controlling means for controlling the first and second head assemblies so that the cassette deck can be used as a tape recorder and telephone answering machine.

The double cassette deck of the invention is preferably provided with at least one cassette operating means connected to the second side portion of the main chassis so that the tape on the second side portion is wound onto one of two reels in recording, playback, fast-forward and rewind modes. The cassette operating means includes two tape wheel gears to be engaged with the reels of the tape cassette, and second driving means for rotating one of the tape wheel gears to there rotate one of the reels.

The first head assembly of the double cassette deck comprises a first slide plate slidably connected to the first side portion, first biasing means for urging the first slide plate toward the driving portion, and a first pinch roller having a holder for rotationally supporting the same. The holder is rotationally connected to the first slide plate and is urged away from the driving portion. A playback head and a foil sensor are also provided on the first slide plate. The first actuating means comprises a first solenoid connected to the slide plate and a first lever connected to the first solenoid. When the first solenoid is actuated, the first pinch roller is pressed against the driving portion of the drive shaft Therefore, if a tape cassette is located in the first side portion, only when the first solenoid is actuated, the tape in the cassette moves for playback.

The second head assembly can be any kind of tape cassette head assembly, but preferably comprises a second slide plate slidably connected to the second side portion, second biasing means for urging the second slide plate toward the cassette operating means on the second side portion, and a second pitch roller having a second holder for rotationally supporting the second pinch roller. The second holder is rotationally connected to the second side portion and is urged so that the second pinch roller is pressed against the driving portion. When the second slide plate is moved away from the cassette operating means, the second pinch roller is also moved away from the driving portion. Recording, playback, and erasing heads are also provided on the second head assembly. The second actuating means comprises a second solenoid connected to the main chassis and a second lever connected to the second solenoid, If the second pinch roller is pressed against the driving portion, when the second solenoid is actuated, the second slide plate is slightly moved to thereby move the second pinch roller away from the driving portion. Therefore, a tape cassette in the second side portion does not move when the second solenoid is actuated.

If the cassette deck is used as a telephone answering machine, a cassette having an endless tape on which a message to a telephone caller is recorded is situated in the first side portion, and a regular tape cassette on which a message from a telephone caller is to be recorded is situated in the second side portion. Therefore, the first head assembly should be in a playback mode, and the second head assembly should be in a recording mode. When a telephone call is received, the entire system including the first and second solenoids operates, so that the endless tape moves but the regular tape does not move for recording. When the foil sensor detects the end of the message from the endless tape, the first and second solenoids stop operating. Consequently, the endless tape stops and the regular tape starts to move for recording the message from a caller. When the telephone line is disconnected, the cassette deck stops operating.

DETAILED DESCRIPTION OF A PREFERRED EMBODIMENT

Figure 1:
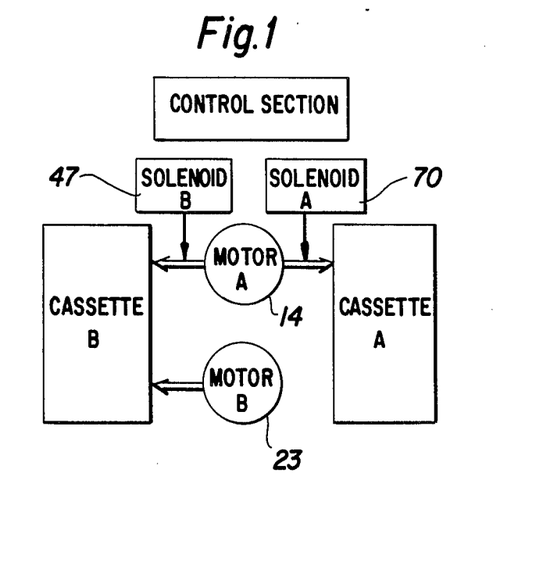
FIG. 1 is a block diagram of a double cassette deck in accordance with the present invention.

Referring to FIG. 1, a block diagram of a double cassette deck in accordance with the present invention is shown, wherein a cassette A is an endless tape for sending a message to a telephone caller, and a cassette B is a regular tape for recording a message from a telephone caller. A motor A operates to rotate drive shafts for the cassettes A and B, and a motor B operates to wind a respective one or the other of the two reels of the cassette B in record, playback, fast forward and rewind modes. Since the cassette A is an endless tape, the reels of the cassette A need not be turned. However, if necessary, the reels of the cassette A may be turned by the motor B or another motor as in the case of the cassette B. Solenoids A and B independently control driving of the cassettes A and B, and a control section totally controls the operation of the double cassette deck.

In the embodiment, a side portion A for receiving the cassette A operates only in a playback mode, and a side portion B for receiving the cassette B operates as a regular tape recorder. The cassette A can be recorded at the side portion B.

Figure 2:
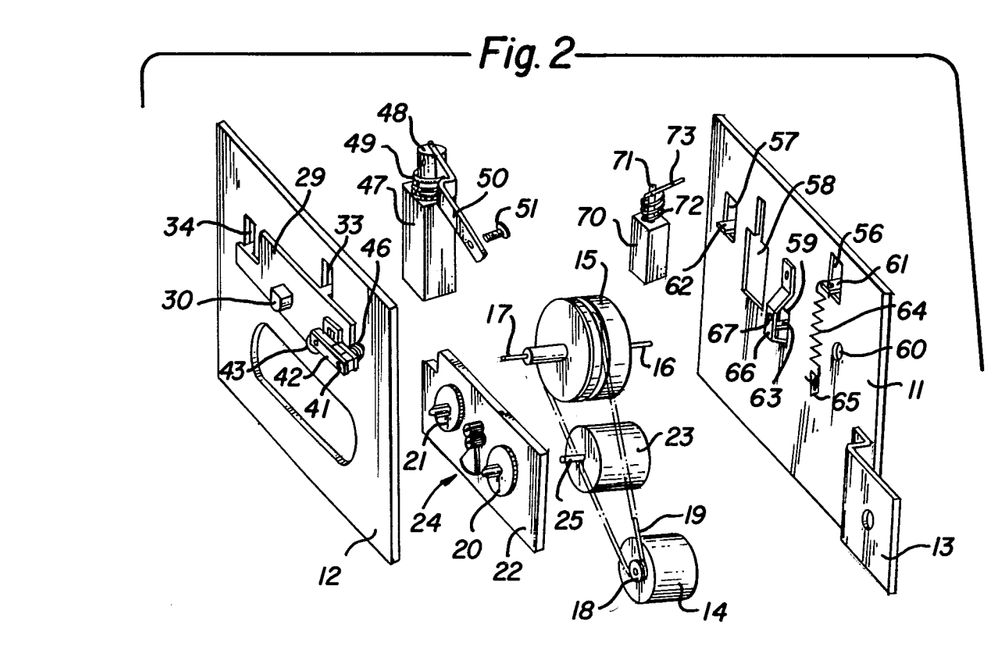
FIG. 2 is an exploded perspective view illustrating a mechanical part of the double cassette deck.

FIGS. 2-8 show a basic mechanical structure of the double cassette deck in accordance with the present invention. As shown in FIG. 2, the cassette deck is provided with base plates 11, 12, which are spaced apart to face parallel to each other and connected together. The outside of the base plate 11 forms the side portion A and the outside of the base plate 12 forms the side portion B. The base plate 11 includes a bracket 13, to which a motor 14 (motor A) is attached. A flywheel 15 having drive shafts 16, 17 is rotationally situated between the base plates 11, 12, the drive shafts 16 and 17 respectively extending outwardly through the base plates 11 and 12. The flywheel 15 is connected to a pulley 18 of the motor 14 by means of a belt 19, so that when the motor 14 is operated, the drive shafts 16, 17 rotate as well.

Two tape wheel gears 20, 21 adapted to be engaged with reels of a tape cassette at the side portion B are freely rotationally held in a tape wheel seat 22 connected to the base plate 12. A motor 23 (motor B) and a gear assembly 24 (FIGS. 2 and 5) are also attached to the seat 22. In particular, the motor 23 is connected to the tape wheel seat 22, and shaft 25 of the motor 23 passes through the seat 22. As clearly shown in FIG. 5, the gear assembly 24 comprises a rocking bracket 26 through which the shaft 25 passes, a motor gear 27 connected to the shaft 25, and an idle gear 28 mounted on the bracket 26 and engaged with the motor gear 27. Although the shaft 25 passes through the rocking bracket 26, the shaft 25 also frictionally engages therewith. Therefore, when the shaft 25 rotates, the bracket 26 is urged to rotate together with the shaft 25.

Figure 3:
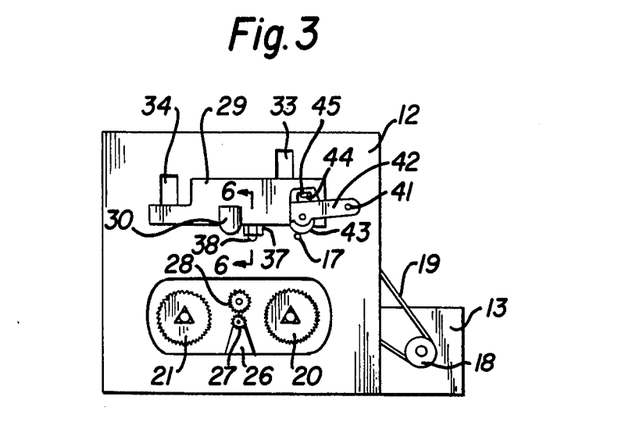
FIG. 3 is a side view of a side portion B of the cassette deck.

For example, when the motor 23 rotates in the clockwise direction in FIG. 3, the bracket 26 is also urged to rotate in the same direction so that the idle gear 28 engages the tape wheel gear 20 for rotating the tape wheel gear 20 in the clockwise direction. Likewise, when the motor 23 rotates in the counter clockwise direction in FIG. 3, the idle gear 28 engages the tape wheel gear 21 to thereby rotate the gear 21 in the counter clockwise direction. When the motor 23 does not rotate, the idle gear 28 does not engage the tape wheel gears 20, 21.

A slide plate 29 provided with a tape head 30 includes two guide projections 31, 32 which engage guide grooves 33, 34 in the base plate 12, so that the slide plate 29 can move on the base plate 12 along with the guide grooves 33, 34. A spring 35 is situated between the guide projection 31 and a projection 36 on the base plate 12 to urge the slide plate 29 to the lowermost position. The base plate 12 also includes an elongated opening 37, in which a plate spring 38 having an opening 39 is situated. A locking projection 40 of the slide plate 29 is disposed on the plate spring 38 to engage or disengage the opening 39 (FIGS. 6, 7).

Figure 4:
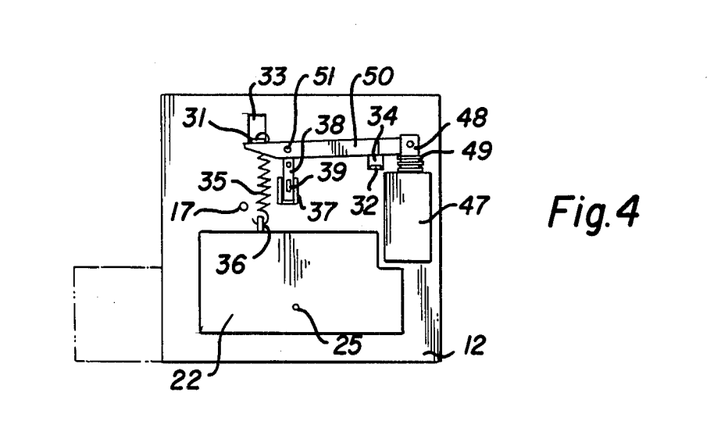
FIG. 4 is a side view of a rear side of the side portion B.
Figure 5:
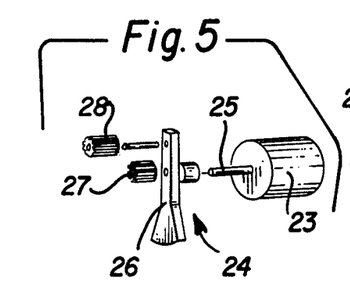
FIG. 5 is an exploded perspective view showing a gear assembly.
Figure 6:
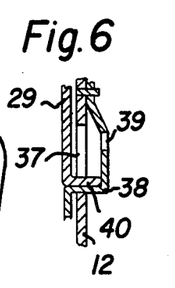
FIG. 6 is an enlarged section view taken along line 6—6 in FIG. 3 showing a slide plate located in the lowermost position.
Figure 7:
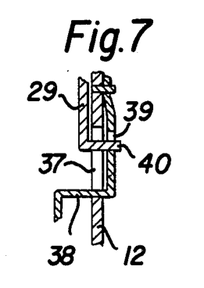
FIG. 7 is an enlarged section view similar to FIG. 6 showing the slide plate located in the uppermost position.
Figure 8:
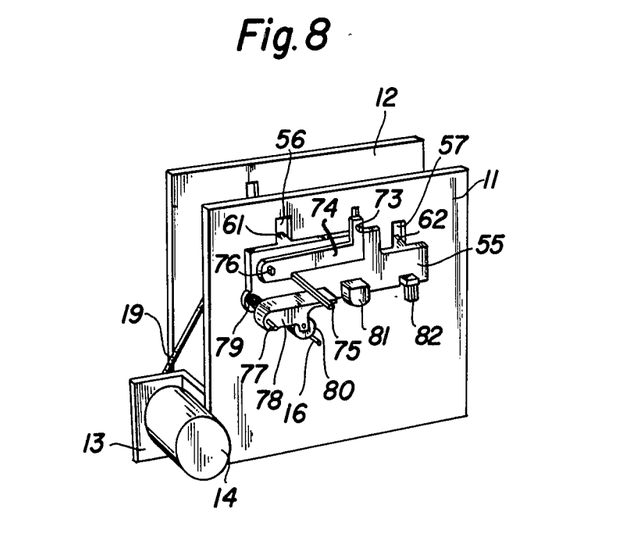
FIG. 8 is a perspective view showing a side portion A of the cassette deck.

As shown in FIG. 6, when the locking projection 40 does not engage the opening 39, the slide plate 29 is located at the lowermost position (as is FIGS. 3 and 4). When the slide plate 29 is moved upwardly to an uppermost position, the locking projection 40 of the slide plate 29 engages the opening 39 (FIG. 7), so that the slide plate 29 stays in that uppermost position. When the slide plate 29 is to be moved to the lowermost position, the plate spring 38 is pushed to disengage the locking projection 40 from the opening 39. Consequently, the slide plate 29 moves to the lowermost position by means of the spring 35.

A shaft 41 for pivotally holding a holder 42 is connected to the base plate 12. The holder 42 rotationally supports a pinch roller 43 and includes an opening 44 which engages a projection 45 of the slide plate 29. A spring 46 is located on the shaft 41 so that the pinch roller 43 is urged to firmly contact the drive shaft 17. When the slide plate 29 is in the lowermost position, the pinch roller 43 contacts the drive shaft 17. However, when the slide plate 29 is moved upwardly, the holder 42 is also moved upwardly by means of the projection 45. Consequently, there appears a space between the pinch roller 43 and the drive shaft 17.

A solenoid 47 (solenoid B) is connected to the base plate 12, the solenoid 47 including a shaft 48 which is urged outwardly by means of a spring 49. A lever 50 is pivotally connected to the base plate 12 by means of a pin 51 in the middle portion thereof. An end of the lever 50 is rotationally connected to the shaft 48, and the other end of the lever 50 is located beneath the guide projection 31 of the slide plate 29. Therefore, when the slide plate 29 is located in the lowermost position, the pinch roller 43 contacts the drive shaft 17, but when the solenoid 47 is actuated, the guide projection 31 is slightly moved upwardly. Consequently, the pinch roller 43 does not contact the drive shaft 17.

When the cassette B is disposed at the side portion B, the slide plate 29 is located at the uppermost position, and a cover (not shown) for the side portion B is also opened. After the cassette B is disposed in the side portion B, the cover is closed. In this action, the plate spring 38 is pushed, so that the slide plate 29 is moved to the lowermost position. When the cassette is to be taken out of the side portion B, an ejection switch (not shown) is pushed, so that the slide plate 29 is moved to the uppermost position and the cover is opened. Then the cassette can be changed.

When the cassette B is snugly located in the side portion B, i.e., the slide plate 29 is in the lowermost position, the tape is pressed against the drive shaft 17 by means of the pinch roller 43. In the record and playback modes, the motor 14 and the motor 23 are actuated to rotate in the counter clockwise direction (in FIG. 3). Thus, the drive shaft 17 and the wheel gear 21 rotate in the counter clockwise direction. The tape moves at a constant speed from right to left.

In the fast forward mode, the motor 14 does not rotate, but the motor 23 rotates at a high speed in the counter clockwise direction. Also, the solenoid 47 is actuated to form a space between the drive shaft 17 and the pinch roller 43. Therefore, the wheel gear 21 rotates in the counter clockwise direction, and the tape can move from right to left in FIG. 3. In the rewind mode, the motor 14 does not rotate, but the motor 23 rotates at a high speed in the clockwise direction and the solenoid 47 is actuated. Thus, the wheel gear 20 rotates in the clockwise direction, so that the tape moves from left to right in FIG. 3.

At the side portion A, a side plate 55 similar to the slide plate 29 is slidably connected to the base plate 11. As clearly shown in FIG. 2, the base plate 11 is provided with two guide grooves 56, 57 similar to the guide grooves 33, 34, two openings 58, 59 and a round opening 60. The slide plate 55 is provided with two guide projections 61, 62 situated in the guide grooves 56, 57 of the base plate 11, and a locking projection 63 similar to the locking projection 40 of the slide plate 29. A spring 64 is situated between the guide projection 61 and a projection 65 on the base plate 11, so that the slide plate 55 is urged to be located at the lowermost position.

A plate spring 66 having an opening 67 is situated in the opening 59. The plate spring 66 operates like the plate spring 38. Namely, the slide plate 55 is located in the lowermost position by the spring 64, whereat the locking projection 63 does not engage the opening 67. When the slide plate 55 is moved upwardly, the locking projection 63 of the slide plate 55 engages the opening 67 of the plate spring 66, so that the slide plate 55 is held in the uppermost position. When the plate spring 66 is pushed, the locking projection 63 disengages the opening 67. Thus, the slide plate 55 moves to the lowermost position.

The drive shaft 16 connected to the flywheel 15 extends through the round opening 60 of the base plate 11 to the side portion A.

A solenoid 70 (solenoid A) is situated between the base plates 11, 12 and includes a shaft 71 urged upwardly by means of a spring 72. A rod 73 is connected to the shaft 71 to extend through the base plate 11 toward the side portion A. The solenoid 70, situated between the base plates 11, 12, is connected to the slide plate 55 through the opening 58, and the rod 73 also passes through the opening 58, so that the slide plate 55 together with the solenoid 70 can be moved between the lowermost position and the uppermost position.

A lever 74 having a push rod 75 is rotationally connected to the slide plate 55 by means of a pin 76. The rod 73 connected to the shaft 71 of the solenoid 70 is rotationally connected to the lever 74. Therefore, when the solenoid 70 is actuated, the lever 74 and the push rod 75 are moved downwardly.

A pin 77 is also connected to the slide plate 55, on which a holder 78 and a spring 79 are situated. The holder 78 rotationally supports a pinch roller 80 and is urged toward the push rod 75 by means of the spring 79. Therefore, even if the slide plate 55 is located in the lowermost position, there is a space between the pinch roller 80 and the drive shaft 16. Only when the solenoid 70 is actuated, the pinch roller 80 contacts the drive shaft 16.

The slide plate 55 is provided with a playback head 81 and a foil sensor 82. As stated before, the cassette A, to be situated in the side portion A, is an endless tape for sending a telephone caller a message recorded on the cassette A. The foil sensor 82 detects the end of the message on the cassette A.

When the cassette A is disposed in the side portion A, the slide plate 55 should be located in the uppermost position, wherein a cover (not shown) is also opened. The cassette A is situated in the side portion A and the cover is closed. Consequently, the plate spring 66 is pushed, and the slide plate 55 is moved to the lowermost position. When the cassette A is removed from the side portion A, an ejection switch (not shown) is actuated, so that the slide plate 55 is moved to the uppermost position and the cover is opened. The cassette A can be taken out of the side portion A.

When the double cassette deck of the invention is used as a telephone answering machine, a pre-recorded endless tape A is situated in the side portion A, and a regular cassette tape B is situated in the side portion B for recording a message from a telephone caller. The cassette A is in a playback mode and the cassette B is in a record mode.

When the double cassette deck receives and detects a telephone call, the double cassette deck starts to operate, wherein the motor 14 (motor A) and the solenoids 70 and 47 (solenoids A and B) are actuated. Consequently, the endless tape A operates to send a message recorded on the endless tape A to a telephone caller. Since the solenoid 47 is actuated, the cassette tape B does not operate. When the message on the endless tape A is over, the foil sensor 82 detects the end of the message. Consequently, the operation of the solenoids 70 and 47 stops, whereby the endless tape A stops. At the same time, the motor 23 starts to rotate. Thus, the cassette tape B in the record mode operates. In this situation, a message from the telephone caller can be recorded on the tape cassette B. When the message is over and the telephone line is disconnected, the operation of the double cassette deck stops. The cassette deck starts again when receiving a next telephone call.

Figure 9A:
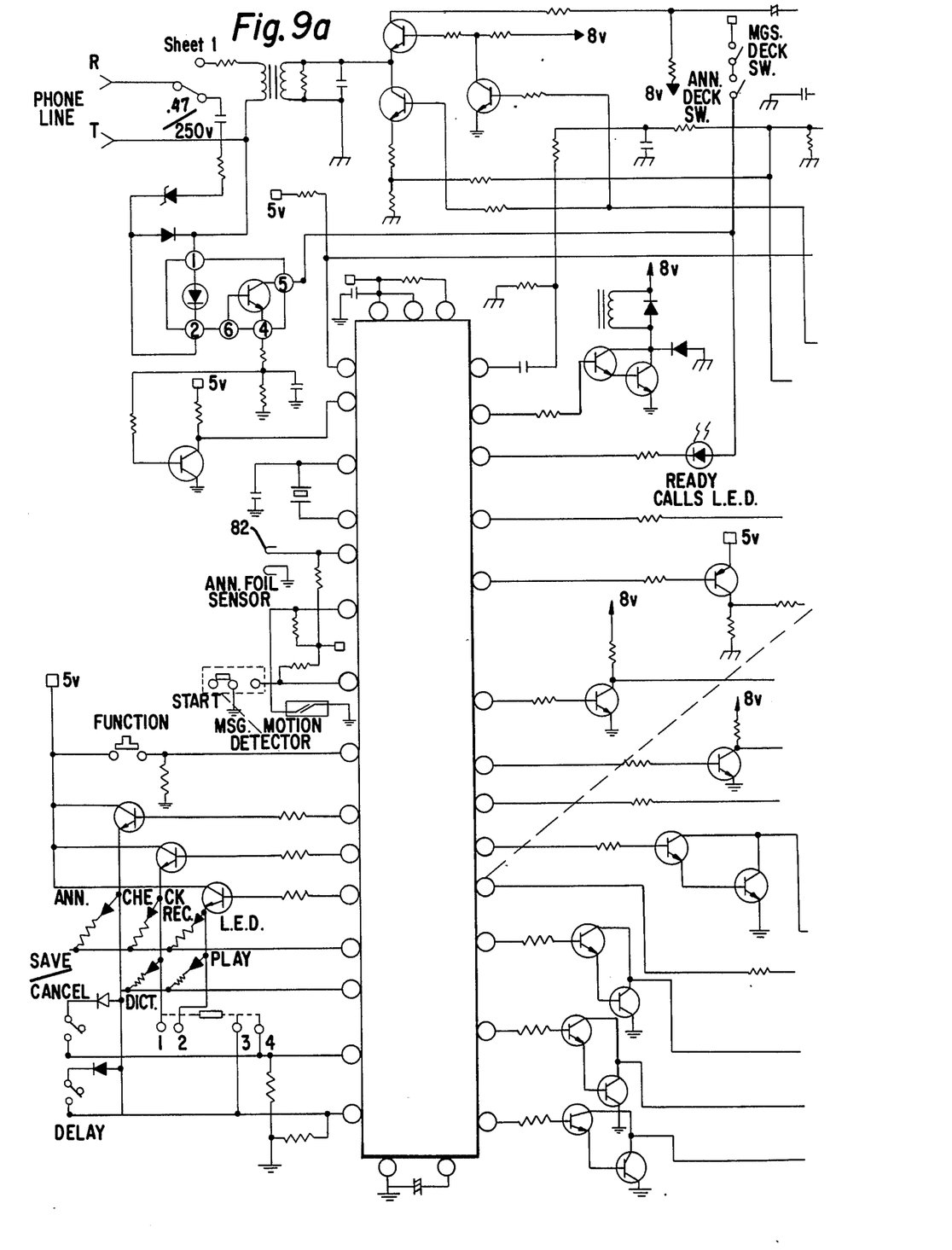
FIGS. 9a and 9b are schematic diagrams illustrating electric circuitry for the double cassette deck of the invention.
Figure 9B:
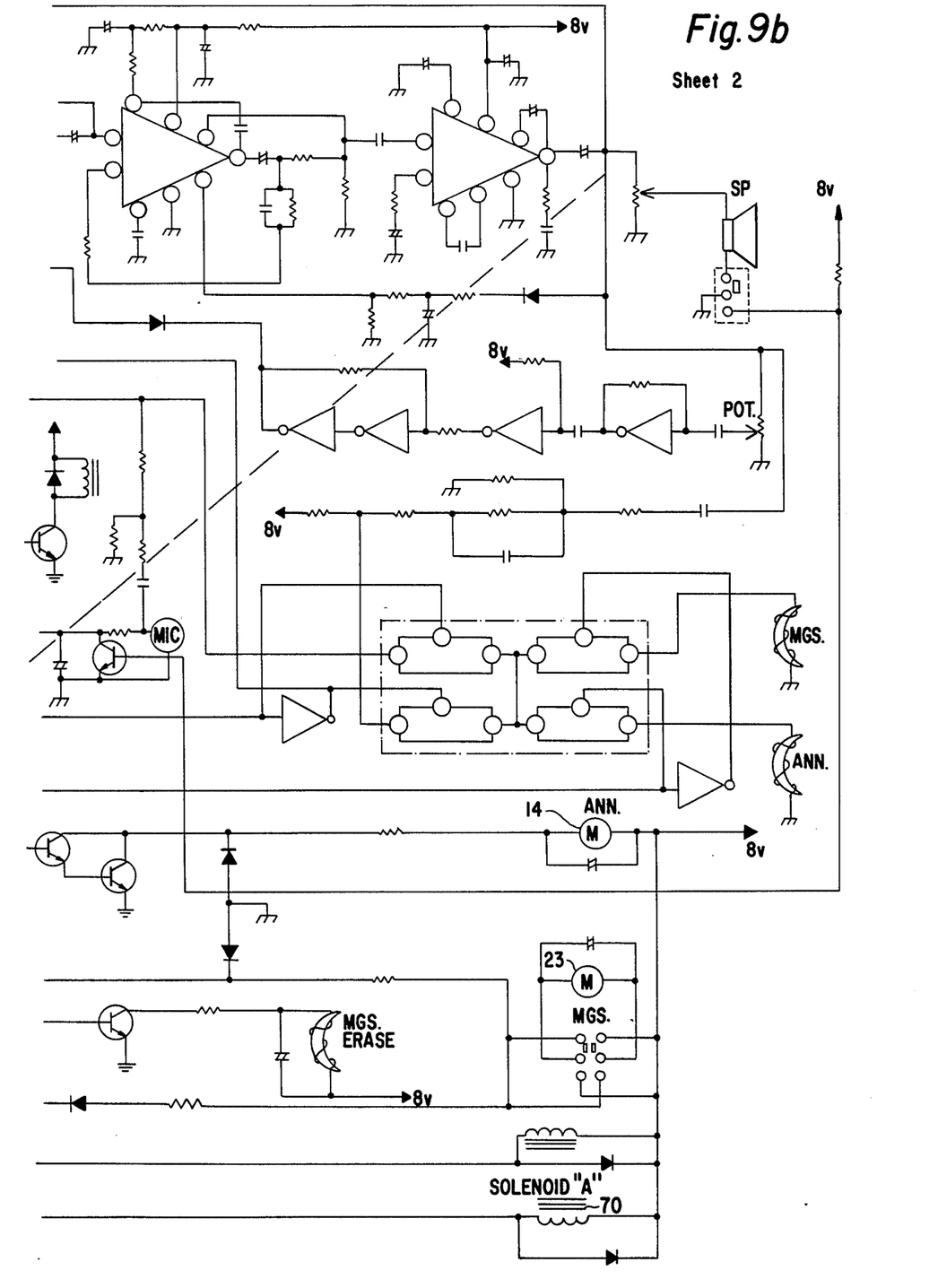

FIG. 9 is a schematic diagram illustrating an electric circuit of the double cassette deck in accordance with the invention. The circuit electrically operates in conformity with the mechanical operations explained above. Since the double cassette deck does not use any special circuit, anyone having ordinary skill in the art will understand the circuit. Therefore, the circuit is not explained in the specification. It is to be understood that any kind of circuit can be used as long as the cassette deck mechanically operates as explained above.

While the invention has been explained with reference to a specific eabodiment, it is to be understood that the explanation is illustrative and the invention is limited only by the appended claims.

What is claimed is:

1. Double cassette deck adapted to be used for a telephone answering machine, comprising
   a main chassis having first and second side portions for mounting first and second tape cassettes respectively to be used in the cassette deck in mutually parallel relation,
   a drive shaft rotationally retained in the main chassis and having first and second coaxial driving shaft portions at opposite ends thereof, said driving portions extending into the respective first and second side portions of the main chassis, said mounting means holding the tapes of said first and second cassettes in positions to be laterally engaged by the sides of said first and second driving shaft portions so that when the tapes are firmly engaged by the driving shaft portions, the tapes are moved at constant speed,
   at least one driving means provided at the main chassis for rotating the drive shaft,
   a first head assembly connected to the first side portion of the main chassis, said first head assembly including first actuating means for engaging the tape of the first cassette with said first driving shaft portion,
   a second head assembly connected to the second side portion of the sain chassis, said second head assembly including second actuating means for engaging the tape of the second cassette with said second driving shaft portion, and
   controlling means for controlling the first and second head assemblies so that the cassette deck can be used as a tape recorder and telephone answering machine.

2. Double cassette deck according to claim 1, further comprising cassette operating means connected at least to the second side portion of the main chassis so that the tape of the second cassette may be wound onto a reel of the second cassette alternatively in one of recording, playback, fast forward and rewind modes.

3. Double cassette deck adapted to be used for a telephone answering machine, comprising
   a main chassis having at least first and second side portions, said side portions being adapted to receive in mutually parallel relation respective first and second tape cassettes to be used in the cassette deck,
   a drive shaft rotationally retained in the main chassis and having driving portions at both ends, said driving portions extending into the respective first and second side portions of the main chassis so that when the tapes are firmly engaged by the driving portions, the tapes are moved at constant speed,
   at least one driving means provided at the main chassis for rotating the drive shaft,
   a first head assembly slidably connected to the first side portion of the main chassis, said first head assembly including first actuating means for intermittently advancing the tapes of the first cassette,
   a second head assembly connected to the second side portion of the main chassis, said second head assembly including second actuating means for intermittently advancing the tape of the second cassette,
   controlling means for controlling the first and second head assemblies so that the cassette deck can be used as a tape recorder and telephone ansering machine, and
   cassette operating means connected at least to the second side portion of the main chassis so that the tape of the second cassette may be wound onto a reel of the second cassette alternatively in one of recording, playback, fast forward and rewind modes,
   said cassette operating means comprising two tape wheel gears adapted to be in engagement with the reels of the second tape cassette, a tape wheel seat connected to the second side portion for rotationally supporting the wheel gears at the second side portion, a transmission gear connected to the tape wheel seat for selectively engaging one of the tape wheel gears, and a second driving means for rotating one of the tape wheel gears through the transmission gear.

4. Double cassette deck adapted to be used for a telephone answering machine, comprising
   a main chassis having at least first and second side portions, said side portions being adapted to receive in mutually parallel relation respective first and second tape cassettes to be used in the cassette deck,
   a drive shaft rotationally retained in the main chassis and having driving portions at both ends, said driving portions extending into the respective first and second side portions of the main chassis so that when the tapes are firmly engaged by the driving portions, the tapes are moved at constant speed,
   at least one driving means provided at the main chassis for rotating the drive shaft,
   a first head assembly slidably connected to the first side portion of the main chassis, said first head assembly including first actuating means for intermittently advancing the tape of the first cassette,
   a second head assembly connected to the second side portion of the main chassis, said second head assembly including second actuating means for intermittently advancing the tape of the second cassette,
   controlling means for controlling the first and second head assemblies so that the cassette deck can be used as a tape recorder and telephone answering machine, and
   cassette operating means connected at least to the second side portion of the main chassis so that the tape of the second cassette may be wound onto a reel of the second cassette alternatively in one of recording, playback, fast forward and rewind modes,
   said second head assembly comprising a slide plate slidably connected to the second side portion, biasing means for urging the slide plate toward the cassette operating means on the second side portion, a recording and playback head provided on the slide plate, and a pinch roller having a holder for rotationally supporting the pinch roller, said holder being rotationally connected to the second side portion of the main chassis and urged so that the pinch roller is pressed against the driving portion of the drive shaft, said pinch roller being moved away from the driving porition at the second side portion when the slide plate is moved away from the cassette operating means.

5. Double cassette deck according to claim 4, in which said second actuating means comprises a solenoid connected to the main chassis, and a lever connected to the solenoid so that if the pinch roller is contacted to the drive shaft driving portion on the second side portion, when the solenoid is actuated, the slide plate is moved to thereby move the pinch roller away from the driving portion on the second side portion.

6. Double cassette deck according to claim 5, in which said solenoid is actuated when the tape cassette on the second side portion is to be in either the fast forward or the rewind mode.

7. Double cassette deck adapted to be used for a telephone answering machine, comprising
   a main chassis having at least first and second side portions, said side portions being adapted to receive in mutually parallel relation respective first and second tape cassettes to be used in the cassette deck,
   a drive shaft rotationally retained in the main chassis and having driving portions at both ends, said driving portions extending into the respective first and second side portions of the main chassis so that when the tapes are firmly engaged by the driving portions, the tapes are moved at constant speed,
   at least one driving means provided at the main chassis for rotating the drive shaft,
   a first head assembly slidably connected to the first side portion of the main chassis, said first head assembly including first actuating means for intermittently advancing the tape of the first cassette,
   a second head assembly connected to the second side portion of the main chassis, said second head assembly including second actuating means for intermittently advancing the tape of the second cassette,
   controlling means for controlling the first and second head assemblies so that the cassette deck can be used as a tape recorder and telephone answering machine, and
   cassette operating means connected at least to the second side portion of the main chassis so that the tape of the second cassette may be wound onto a reel of the second cassette alternatively in one of recording, playback, fast forward and rewind modes, said first head assembly comprising a slide plate slidably connected to the first side portion, biasing means for urging the slide plate toward the drive shaft driving portion on the first side portion,
a playback head provided on the slide plate, a foil sensor provided on the slide plate adjacent to the playback head, and a pinch roller having a holder for rotationally supporting the roller, said holder being rotationally connected to the slide plate and urged away from the driving portion of the first side portion.

8. Double cassette deck according to claim 7, in which said first actuating means comprises a solenoid connected to the slide plate, and a lever connected to the solenoid so that when the solenoid is actuated, the pinch roller is pressed against the drive shaft driving portion on the first side, whereby if a tape cassette is located in the first side portion, the tape in the tape cassette moves only when the solenoid is actuated.

9. Double cassette deck according to claim 8, in which said second head assembly comprises a second slide plate slidably connected to the second side portion, second biasing means for urging the second slide plate toward the cassette opening means on the second side portion, a recording and playback head provided on the second slide plate, a second pinch rolled having a second holder for rotationally supporting the second pinch roller, said second holder being rotationally connected to the second side portion of the main chassis and urged so that the second pinch roller is pressed against the driving portion on the second side portion, said second pinch roller being moved away from the driving portion on the second side portion when the second slide plate is moved away from the cassette operating means, a second solenoid connected to the main chassis, and a second lever connected to the second solenoid so that if the second pinch roller is pressed against the driving portion, when the second solenoid is actuated, the second slide plate is moved to thereby move the second pinch roller away from the driving portion on the second side portion, said second solenoid and second lever forming the second actuating means.

10. Double cassette deck according to claim 9, for use as a telephone answering machine, further comprising a tape cassette containing an endless tape situated on the first side portion for sending a message recorded on the endless tape to a telephone caller when a telephone call is received, and a conventional tape cassette situated on the second side portion for recording a message from the telephone caller after the message recorded on the endless tape is sent to the telephone caller.

11. Double cassette deck according to claim 10, in which said controlling means is actuated so that when a telephone call is received, the driving means, the cassette operating means in the recording mode, and the first and second solenoids operate to thereby send the message recorded on the endless tape to the telephone caller, and after the recorded message is transmitted to the caller, the first and second solenoids do not operate whereby the message from the caller is recorded on the tape cassette in the second side portion.

* * * * *